US010086563B2

(12) United States Patent
Hattori et al.

(10) Patent No.: US 10,086,563 B2
(45) Date of Patent: Oct. 2, 2018

(54) METHOD OF PRODUCING COMPOSITE MATERIAL (71) Applicant: MITSUBISHI HEAVY INDUSTRIES, LTD., Minato-ku, Tokyo (JP)

(72) Inventors: Hidetaka Hattori, Tokyo (JP); Noriya Hayashi, Tokyo (JP); Akihisa Watanabe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/761,613

(22) PCT Filed: Dec. 18, 2013

(86) PCT No.: PCT/JP2013/083893
§ 371 (c)(1),
(2) Date: Jul. 16, 2015

(87) PCT Pub. No.: WO2014/112274
PCT Pub. Date: Jul. 24, 2014

(65) Prior Publication Data
US 2015/0367559 A1 Dec. 24, 2015

(30) Foreign Application Priority Data

Jan. 18, 2013 (JP) .................................. 2013-007628

(51) Int. Cl.
*B29C 65/00* (2006.01)
*B29C 43/18* (2006.01)
(Continued)

(52) U.S. Cl.
CPC ........ *B29C 66/91941* (2013.01); *B29C 43/12* (2013.01); *B29C 43/18* (2013.01);
(Continued)

(58) Field of Classification Search
CPC ........ B29C 66/91943; B29C 66/73753; B29C 66/73754; B29C 66/1122; B29C 66/131;
(Continued)

(56) References Cited

U.S. PATENT DOCUMENTS 6,475,320 B1 11/2002 Masugi
2010/0092695 A1* 4/2010 Schultz .................. C08J 5/06
427/569
(Continued)

FOREIGN PATENT DOCUMENTS

CN 1926188 A 3/2007
CN 102648235 A 8/2012
(Continued)

OTHER PUBLICATIONS

"DSC Measurements of Epoxy Adhesive"; Nakamura; Oct. 1991.*
(Continued)

*Primary Examiner* — John L Goff, II
(74) *Attorney, Agent, or Firm* — Hauptman Ham, LLP (57) ABSTRACT A method of producing a composite material includes preparing at least one molded product raw material by primary curing; preparing an assembled body by assembling the primarily cured molded product raw material with another molded product raw material; and integrally forming the molded product raw materials by heating the assembled body to a temperature equivalent to or higher than a glass transition point of the primarily cured molded product raw material to cause a phase of the at least one molded product raw material to transition to a rubberized state, by allowing an adhesive adjacent to the molded product raw material or the other molded product raw material adjacent to the molded product raw material to coexist with the molded
(Continued)

product raw material in the rubberized state, and by secondarily curing the primarily cured at least one molded product raw material.

3 Claims, 8 Drawing Sheets

(51) Int. Cl.
| | | |
|---|---|---|
| *B29C 43/12* | (2006.01) | |
| *B29C 70/44* | (2006.01) | |
| *B29D 99/00* | (2010.01) | |
| *B29C 65/02* | (2006.01) | |
| *B29K 105/08* | (2006.01) | |
| *B29L 31/00* | (2006.01) | |
| *B29L 31/30* | (2006.01) | |
| *B29L 31/08* | (2006.01) | |

(52) U.S. Cl.
CPC ............ *B29C 65/02* (2013.01); *B29C 65/022* (2013.01); *B29C 66/1122* (2013.01); *B29C 66/131* (2013.01); *B29C 66/474* (2013.01); *B29C 66/524* (2013.01); *B29C 66/721* (2013.01); *B29C 66/73117* (2013.01); *B29C 66/73754* (2013.01); *B29C 66/81455* (2013.01); *B29C 66/91943* (2013.01); *B29C 70/44* (2013.01); *B29D 99/001* (2013.01); *B29C 66/71* (2013.01); *B29C 66/7392* (2013.01); *B29C 66/8432* (2013.01); *B29K 2105/0872* (2013.01); *B29L 2031/003* (2013.01); *B29L 2031/082* (2013.01); *B29L 2031/3076* (2013.01); *B29L 2031/3082* (2013.01); *B29L 2031/3085* (2013.01); *Y02T 50/43* (2013.01)

(58) Field of Classification Search
CPC ... B29C 66/474; B29C 66/524; B29C 66/721; B29C 66/81455; B29C 66/91643; B29C 65/02; B29C 65/022; B29C 66/919; B29C 66/91941; B32B 2038/0076; B29D 99/001
USPC .......................................... 156/307.1–307.7
See application file for complete search history.

(56) References Cited

U.S. PATENT DOCUMENTS

| | | | |
|---|---|---|---|
| 2010/0124659 A1* | 5/2010 | Nelson | B29C 35/0266 428/411.1 |
| 2010/0147460 A1 | 6/2010 | Lefebure | |
| 2010/0252180 A1* | 10/2010 | Rincon | B29C 66/73941 156/182 |
| 2012/0231687 A1 | 9/2012 | Miura et al. | |

FOREIGN PATENT DOCUMENTS

| | | |
|---|---|---|
| EP | 1074466 A1 | 2/2001 |
| EP | 2055464 A1 | 5/2009 |
| JP | 2647530 B2 | 8/1997 |
| JP | 10-128860 A | 5/1998 |
| JP | 11-193322 A | 7/1999 |
| JP | 2001-48096 A | 2/2001 |
| JP | 2001-89639 A | 4/2001 |
| JP | 2001-253393 A | 9/2001 |
| JP | 3944217 B2 | 7/2007 |
| JP | 3950241 B2 | 7/2007 |
| JP | 4108094 B2 | 6/2008 |
| JP | 4241721 B2 | 3/2009 |
| JP | 2010-527303 A | 8/2010 |
| JP | 2011-79989 A | 4/2011 |
| WO | 2011/040602 A1 | 4/2011 |
| WO | 2011/085730 A1 | 7/2011 |

OTHER PUBLICATIONS

"Enhanced DSC Instrumentation Design and Characterization of Adhesives"; Adhesivesmag.com; Jan. 2002.*
Office Action in CN Application No. 201380074711.7, dated May 31, 2016.
International Preliminary Report on Patentability dated Jul. 30, 2015, corresponding to International application No. PCT/JP2013/083893.
International Search Report dated Mar. 11, 2014, corresponding to International application No. PCT/JP2013/083893.
Office Action in JP Application No. 2013-007628, dated Aug. 26, 2016.
Extended European Search Report in EP Application No. 13872030.5, dated Sep. 29, 2016.

* cited by examiner

METHOD OF PRODUCING COMPOSITE MATERIAL

RELATED APPLICATIONS

The present application is a National Phase of International Application Number PCT/JP2013/083893, filed Dec. 18, 2013, which claims priority to Japanese Application Number 2013-007628, filed Jan. 18, 2013.

TECHNICAL FIELD

The present invention relates to a method of producing a composite material such as a stiffener panel for aircraft.

BACKGROUND ART

Stiffener panels are known as panels that are conventionally employed for a wing structure, a fuselage structure, and the like of aircraft.

As a method of producing a composite material for such a stiffener panel, a method such as an integral molding method has been used.

For this integral molding method, the method according to JP 2647530 (Patent Literature 1) is known, which corresponds to an Application filed by the applicants of the present invention. In this molding method, a molding product raw material for a composite material is held by a holding tool having a shape for integral molding of composite material to integrally cure the entire material.

In this integral molding method, the strength of the composite material to be obtained is excellent because the entire molded product raw material is integrally cured. However, if the raw material for the stiffener has been liquefied, it may often be necessary to use complex jigs for maintaining the shape of the stiffener, and thus, the process may be burdensome.

On the other hand, as a method of producing a composite material for stiffener panels, a method such as a co-bonding method has been used.

In this co-bonding method, a panel or a stiffener that has been previously cured and molded, and the other that has not been cured and molded, are bonded using an adhesive, and the resultant is cured in an autoclave.

In this co-bonding method, because the panel or the stiffener has been previously cured, ease of handling of the molded product raw materials in production is excellent. However, because the strength of the composite material to be obtained depends on the strength of the bonding of the adhesive applied between the stiffener and the panel, it is necessary to devise measures to improve the quality of the bonding.

CITATION LIST

Patent Literature

[Patent Literature 1] JP 2647530 B1

SUMMARY OF INVENTION

Technical Problem

The present invention was made in consideration of the above-described circumstances, and an object of the present invention is to provide a method for producing a composite material for a stiffener panel and the like for aircraft with an excellent strength, in which the ease of handling of molded product raw materials in production processes is excellent.

Solution to Problem

In order to achieve the above-described object, according to an aspect of the present invention, a method of producing a composite material, in which the composite material is constituted by at least two molded product raw materials, includes preparing at least one of the molded product raw materials for constituting the composite material by primary curing; preparing an assembled body by assembling the primarily cured molded product raw material with another molded product raw material for constituting the composite material via an adhesive or by not using an adhesive; and integrally forming the at least one molded product raw material and the another molded product raw material by heating the assembled body to a temperature equivalent to or higher than a glass transition point of the at least one primarily cured molded product raw material to cause a phase of the at least one molded product raw material to transition to a rubberized state, by allowing an adhesive existing adjacent to the molded product raw material or another molded product raw material existing adjacent to the molded product raw material to coexist with the molded product raw material in the rubberized state, and by secondarily curing the primarily cured at least one molded product raw material.

It is necessary that the "another molded product raw material", if no adhesive is used for the integration, be formed integrally with the "at least one molded product raw material" after running a reaction curing process that implements a function similar to the function of an adhesive. However, if an adhesive is used, it is not necessary to run such a reaction, and in this case, the "another molded product raw material" can be employed regardless of the cured state. For example, a molded product raw material that has been completely cured can be employed. The type of the molded product raw material may a metal.

According to another aspect of the present invention, in the method of producing the composite material, a glass transition point Tg for the primarily cured molded product raw material and a reaction temperature Tr for the adhesive existing adjacent to the molded product raw material or the another molded product raw material existing adjacent to the molded product raw material are set so as to satisfy any of the following conditions (i) to (x):

(i) a control range where:

$dT31 = Tr3 - Tg1 \geq 30°$ C., and $Tr2 - Tg1 > 0°$ C.;

(ii) a control range that is the control range (i) where:

$dT21 = Tr2 - Tg1 \geq 25°$ C.;

(iii) a control range that is the control range (ii) where:

$dT11 = Tr1 - Tg1 \geq 20°$ C.;

(iv) a control range where:

$dT32 = Tr3 - Tg2 \geq 10°$ C., and $Tr2 - Tg1 > 0°$ C.;

(v) a control range that is the control range (iv) where:

$dT22 = Tr2 - Tg2 \geq 5°$ C.;

(vi) a control range that is the control range (v) where:

$dT12 = Tr1 - Tg2 \geq 0°$ C.;

(vii) a control range where:

$dT33=Tr3-Tg3\geq 0°$ C., and $Tr2-Tg1>0°$ C.;

(viii) a control range where:

$dT23=Tr2-Tg3\geq 0°$ C.;

(ix) a control range where:

$dT13=Tr1-Tg3\geq 0°$ C.; and (x) a control range where:

$dT13=Tr1-Tg3\geq 10°$ C.

where Tg1, Tg2, Tg3, Tr1, Tr2, and Tr3 are the following temperatures:

Tg1: a storage elastic modulus decrease start point for the primarily cured molded product raw material;

Tg2: a temperature at a timing around a midpoint of phase transition from a glass state to the rubberized state of the primarily cured molded product raw material (a temperature for tan δ (=loss elastic modulus/storage elastic modulus);

Tg3: a storage elastic modulus decrease end point for the primarily cured molded product raw material;

Tr1: a reaction start point temperature for the adhesive existing adjacent to the primarily cured molded product raw material or the another molded product raw material existing adjacent to the primarily cured molded product raw material;

Tr2: a reaction temperature for the adhesive existing adjacent to the primarily cured molded product raw material or the another molded product raw material existing adjacent to the primarily cured molded product raw material; and Tr3: a reaction end point temperature for the adhesive existing adjacent to the primarily cured molded product raw material or the another molded product raw material existing adjacent to the primarily cured molded product raw material.

According to yet another aspect of the present invention, in the method of producing the composite material, the composite material may be a composite material including a stiffener raw material and a panel raw material. The composite material may be used for a wing material or a fuselage material for aircraft. In this aspect, the stiffener raw material may be primarily cured.

In a yet another aspect of the present invention, in the method of producing the composite material, the stiffener raw material may include a fiber reinforced resin that uses a chain-curing type resin.

Advantageous Effects of Invention

According to the present invention, the method of producing a composite material for a stiffener panel and the like for aircraft with an excellent strength, in which the ease of handling of molded product raw materials in production processes is excellent, is provided.

BRIEF DESCRIPTION OF DRAWINGS

FIG. 2 is a view illustrating an embodiment of the method of producing a composite material according to the present invention, which is a cross section for illustrating a state in which an inside of a cavity is evacuated by a vacuum pump and the like.

FIG. 6 is a view illustrating an embodiment of the method of producing a composite material according to the present invention, which is a cross section for illustrating a state in which the molding jig is cooled with water or the like.

DESCRIPTION OF EMBODIMENTS

A method of producing a composite material according to the present invention will be described below with reference to embodiments illustrated in the attached drawings.

In a preferred embodiment of the method of producing a composite material according to the present invention, at least the following processes are carried out.

(1) A primarily cured stiffener raw material is prepared. In this process, the primarily cured stiffener raw material corresponds to "at least one primarily cured molded product raw material".

(2) A panel raw material is prepared. This panel raw material corresponds to "the other molded product raw material constituting the composite material". The panel raw material can be prepared at any timing such as the same timing as the preparation of the stiffener raw material, a timing before the preparation of the stiffener raw material, and a timing after the preparation of the stiffener raw material.

(3) The panel raw material is assembled to the primarily cured stiffener raw material via an adhesive to form an assembled body.

(4) The assembled body is heated to a temperature equivalent to or higher than the glass transition point of the primarily cured stiffener raw material to cause the phase of the stiffener raw material to transition into a rubberized state, the assembled body is thus allowed to coexist with the raw material in the rubberized state in the process of curing the adhesive existing adjacent to the stiffener raw material, and the stiffener raw material is secondarily cured to integrate the stiffener raw material and the panel raw material.

Stiffener raw materials are referred to by a number of different terms, such as beams, ribs, frames, stringers, sills, spars, longerons, skeletons, frameworks, longitudinal members, and the like.

Panel raw materials are also referred to by a number of different terms, such as skins, outer plates, outer skins, facing skins, bulkhead (pressure bulkhead) panels, or the like.

First, an embodiment of the step for preparing the stiffener raw material will be described with reference to FIGS. 1 to 6.

Figure 1:
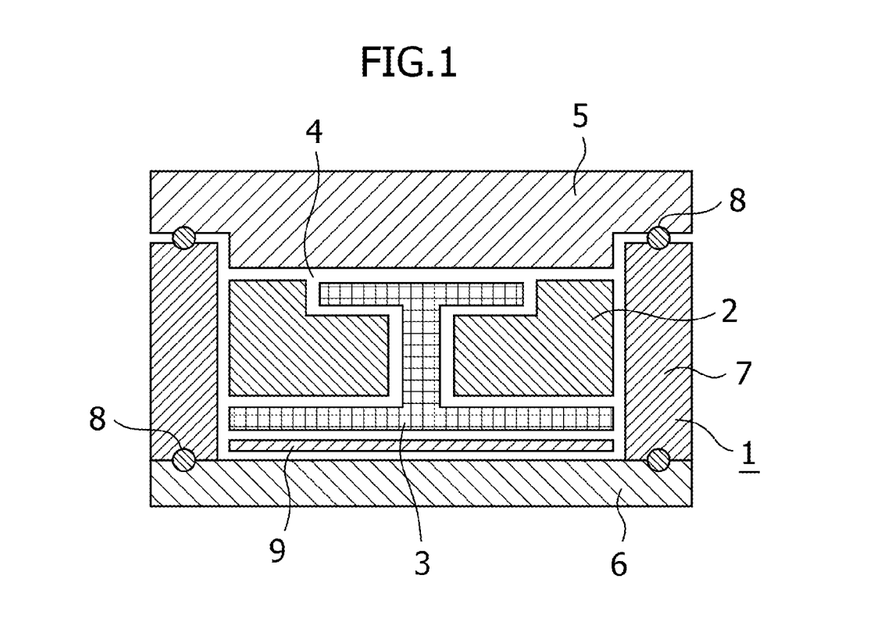
FIG. 1 is a view illustrating an embodiment of the method of producing a composite material according to the present invention, which is a cross section for illustrating a state in which a core mold and a fiber base material are arranged in a molding jig.

Referring to FIG. 1, a core mold 2 and a fiber base material (preform) 3 are arranged in a molding jig (molding tool) 1.

In the present invention, by using the molding jig 1, the stiffener raw material is molded by the resin transfer molding (RTM) method. However, the method of molding the stiffener raw material is not limited to the RTM method. For example, an autoclave molding method can be used.

In an RTM molding device for carrying out the RTM method, a cavity 4 for molding a product is formed in the inside of the molding jig 1 as illustrated in the drawing. The RTM molding device is provided with a pair of presses (not illustrated) arranged to an outside of the upper lid 5 and the lower lid 6 of the molding jig 1 and configured to sandwich the molding jig 1 to externally apply pressure to the molding jig 1; however, alternatively, another mechanism capable of closing and fixing the molding jig 1 may be used. It is preferable to use presses for easy control of the clamping force.

The molding jig 1 is provided with a resin injection pipe and a vacuum pipe for injecting a resin material into the cavity 4 arranged on one end of the molding jig 1, although this is not illustrated in FIG. 1. The resin injection pipe is connected to a mechanism for injecting the resin material. More specifically, the resin injection pipe is connected to an injector, for example. It is preferable that the mechanism for injecting the resin material be provided with a function for pressurizing the inside of the molding jig 1. The vacuum pipe is connected to the vacuum pump via a vacuum line. In order to prevent the resin material from being drawn into the vacuum pump, the vacuum line can be provided with a vacuum trap and the like.

A sealer 8 for sealing a mating surface is arranged between the upper lid 5 and a frame mold 7 and between the lower lid 6 and the frame mold 7.

Materials commonly used as mold materials can be used for the molding jig 1 and the core mold 2. Examples of such materials include metals, such as aluminium, aluminum alloys, iron, and alloy steel such as stainless steel or invar; fiber reinforced resins; and glass. In addition, the molding jig 1 and the core mold 2 can be constituted by adiabatic materials instead of the above-described nonadiabatic ones. The adiabatic material is not limited to a specific one; however, it is preferable to use a material of which the thermal conductivity is 0.3 W/(m·K) or less; more preferably one with the thermal conductivity of 0.2 W/(m·K) or less; and most preferably one with the thermal conductivity of 0.1 W/(m·K) or less. Furthermore, it is preferable to use a material with a low volumetric specific heat for the material. For example, a material with a volumetric specific heat equal to or less than that of aluminium is preferable. In addition, it is preferable to use a material with a small heat capacity for the material. For example, a material with a heat capacity equal to or less than that of aluminium is preferable. For example, a material constituted by a heat resisting surface made of a polymer film and an inside made of foam can be used.

For the fiber base material 3, a wide variety of fibers for fiber reinforced resins, such as glass fibers, carbon fibers, and aramid fibers, can be used. Jigs and parts, such as nuts, and the like, may be attached to the fiber base material 3 where necessary.

A release agent 9 such as a peel ply is arranged between the fiber base material 3 and the lower lid 6. This release agent 9 is provided if necessary. A release agent may be also arranged between the fiber base material 3 and the upper lid 5.

Furthermore, a release agent (not illustrated) such as a peel ply may be arranged between the core mold 2 and the fiber base material 3, where necessary. Alternatively, the surface of the core mold 2 may be treated by releasing treatment. Further alternatively, the core mold 2 may be constituted by a mold release material.

The core mold 2 and the molding jig 1, which contact the fiber base material 3, may be provided with a structure for fixing the fiber base material 3 at a predetermined position, where necessary. For example, in the example illustrated in FIG. 1, the upper lid 5, the lower lid 6, the frame mold 7, or the core mold 2 may be provided with such a structure. After the fiber base material 3 is placed in the inside of the molding jig 1 together with the core mold 2, the upper lid 5 and the lower lid 6 are closed. After the molds are closed, the molding jig 1 is sandwiched by a press or the like to externally apply pressure thereto, where necessary.

Figure 2:
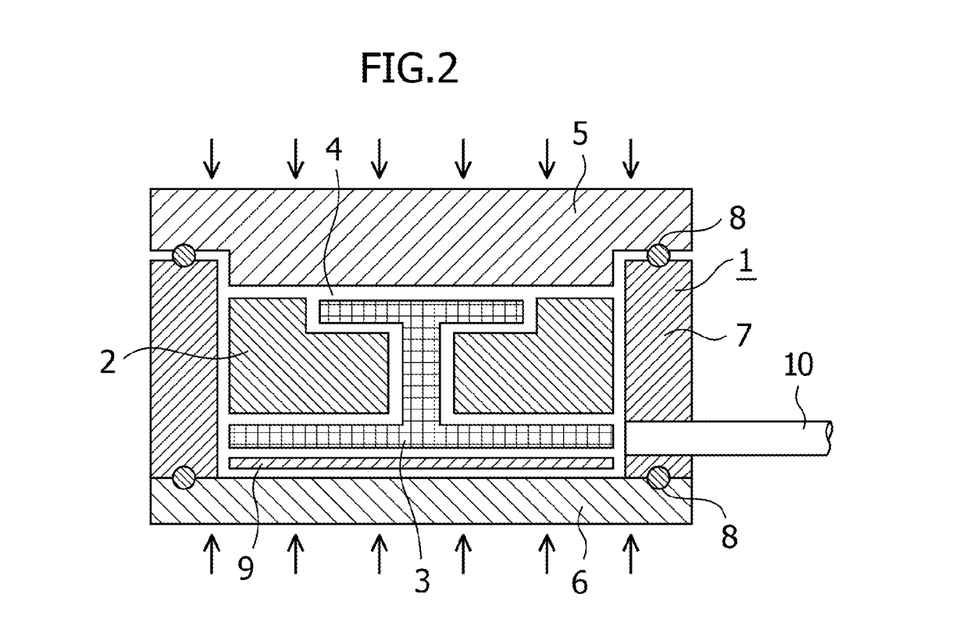

Next, Referring to FIG. 2, the cavity 4 is evacuated by the vacuum pump or the like via a vacuum pipe 10 and the vacuum line, where necessary. It is particularly preferable to evacuate the inside of the cavity 4 until the inside is a vacuum.

In addition, the molding jig 1 may be warmed by hot plates and the like, where necessary. If the molding jig 1 is to be warmed, the molding jig 1 is warmed to a predetermined temperature such as an impregnation temperature or a drying temperature.

Figure 3:
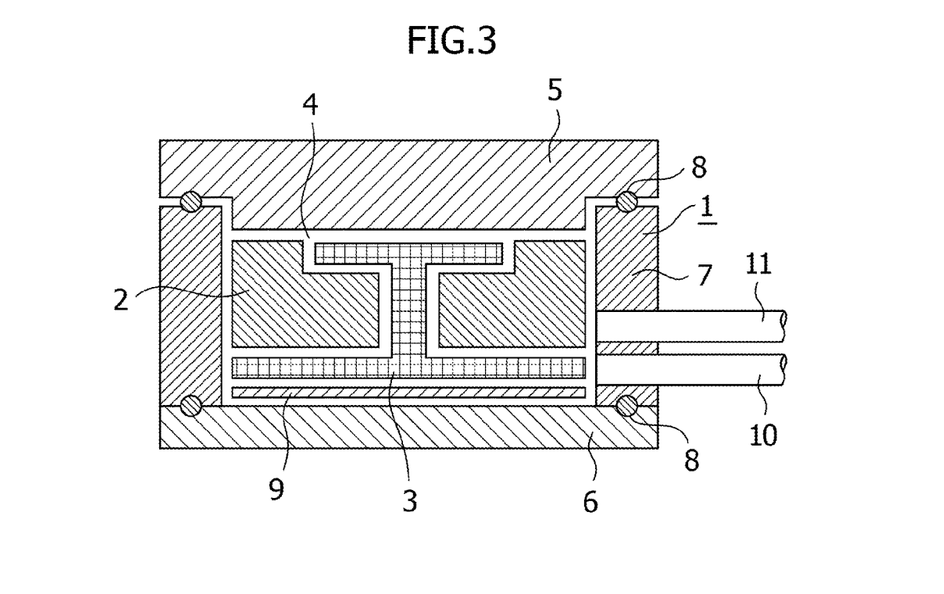
FIG. 3 is a view illustrating an embodiment of the method of producing a composite material according to the present invention, which is a cross section for illustrating a state in which a resin material is injected from an injector or the like into the cavity via a resin injection pipe.
Figure 4:
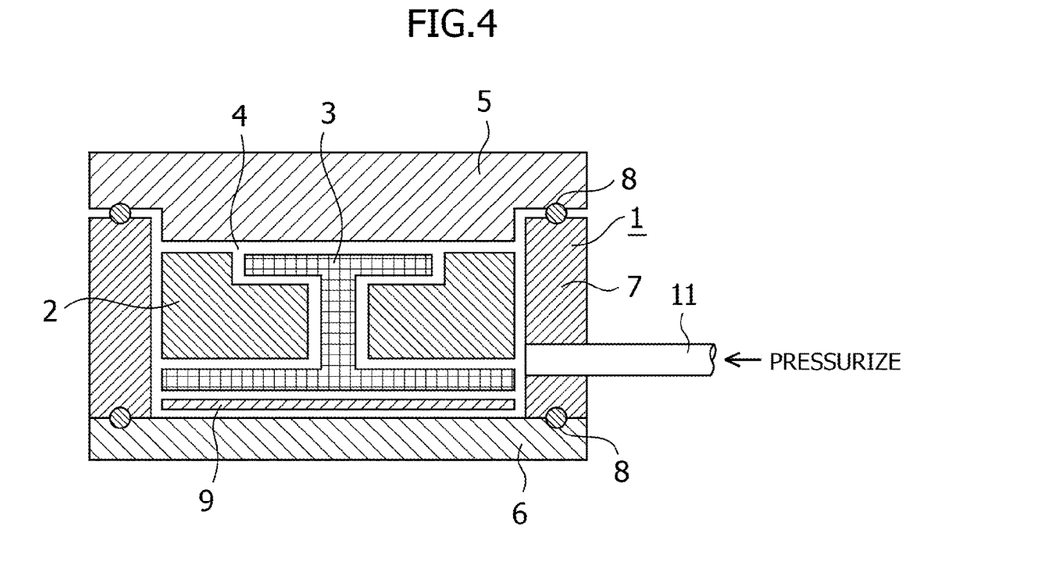
FIG. 4 is a view illustrating an embodiment of the method of producing a composite material according to the present invention, which is a cross section for illustrating a state in which the vacuum pipe is closed and the pressure in the inside of the cavity is increased by a pressure from the resin injection pipe.

Subsequently, Referring to FIG. 3, the resin material is injected into the cavity 4 from the injector and the like via a resin injection pipe 11. The resin material may be preheated prior to its injection. The resin material flows inside the molding jig 1 via a resin flow path between the end of the core mold 2 and the lower lid 6, a resin flow path between the upper lid 5, the lower lid 6, and the frame mold 7 and the fiber base material 3, and a resin flow path between the core mold 2 and the fiber base material 3 to immediately fill up the inside of the cavity 4. Note that the upper lid 5, the lower lid 6, the frame mold 7, and the core mold 2 may be respectively provided with a resin flow path in which the resin material flows, where necessary.

The vacuum pipe 10 may be closed and pressure may be applied by using a mechanism for injecting the resin material, e.g. an injector or the like, where necessary. By applying pressure by means of the injector, the impregnation of the resin material can be promoted.

After the cavity 4 has been filled with the resin material, the vacuum pipe 10 may be closed and the pressure in the inside of the cavity 4 may be increased by the pressure from the resin injection pipe 11 (FIG. 4), where necessary. For the pressure to be applied, a pressure of 3 atmospheres or more is preferable, 5 atmospheres or more is more preferable, and 10 atmospheres or more is most preferable. The upper limit of the pressure in the inside of the cavity 4 is not particularly limited; however, 100 atmospheres or less is preferable. After the resin material has been impregnated into the fiber base material 3, the molding jig 1 may be further clamped by a press or the like, when necessary.

Figure 5:
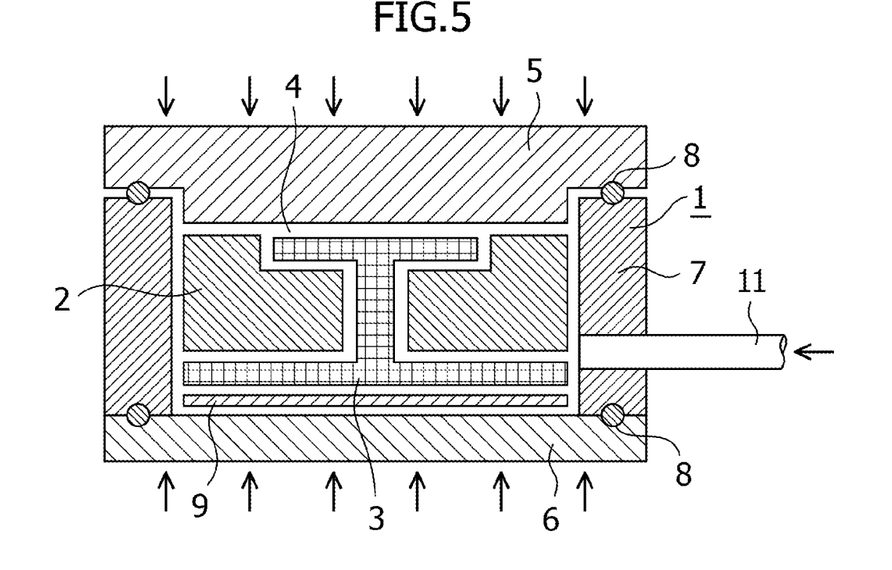
FIG. 5 is a view illustrating an embodiment of the method of producing a composite material according to the present invention, which is a cross section for illustrating a state in which the injected resin material is subjected to primary curing.

Then, the injected resin material is cured (FIG. 5). The resin material is cured by heating or irradiation with ultraviolet (UV) rays or by using both in accordance with the type of the resin material to be used. The heating can be implemented by using a heating function included in a heater or the like included in the hot plate and the like and the molding jig, for example. The irradiation with UV rays can be implemented by using a UV lamp (not illustrated).

In the present invention, the cure is carried out so that it does not go beyond primary curing (half curing). The term "primary curing (half curing)" herein refers to a state of curing in which the resin material has been solidified but the crosslinking reaction has not been completed, but it is a cured state in which the resin material has been cured to a handleable state. The temperature to be used when heat is used for the curing differs in accordance with the composition of the resin material and the catalyst to be used. By using a diabatic material for the molding jig 1 and the core mold 2, the temperature of the resin material can be easily controlled during the curing.

Note that the control of the curing only up to the primarily cured (half-cured) state will be described below in further detail.

For the resin material to be used, it is preferable to use a chain-curing type resin composition. A "chain-curing type resin composition" is a resin with characteristics such that its curing starts when heat is applied thereto or when it is irradiated with rays such as UV rays or the like; that cure reaction heat is generated in the process of curing, a cure reaction progresses as a chain reaction due to the generated cure reaction heat, and thus the cure reaction heat is serially generated; and that the cure reaction progresses as a chain reaction due to self-generated heat generated during the cure reaction without being irradiated with energy rays and regardless of whether a ray shielding substance is present or not in a composition (Japanese Patent Application Laid-Open No. 11-193322, Japanese Patent No. 3950241, and Japanese Patent No. 3944217).

For the chain-curing type resin composition like this, a resin composition can be used, which is produced by mixing a photopolymerization resin component, such as a photopolymerization oligomer, a photopolymerization monomer, and the like, and a polymerization initiator component composed of binary or higher polymers constituted by a photopolymerization initiator and a photothermal polymerization initiator for starting both photopolymerization and thermal polymerization, for example. For the photopolymerization resin component, a cationic resin is preferable; an epoxy resin is more preferable; and a cycloaliphatic epoxy resin, a glycidyl ether type epoxy resin, and an epoxidized polyolefin resin are yet more preferable. For the photopolymerization initiator, a diazonium salt, an iodonium salt, a pyridinium salt, a phosphonium salt, a sulfonium salt, an iron-allene compound, and a sulfonate are preferable. For the photothermal polymerization initiator, an aryl-based sulfonium salt is preferable. It is preferable that 0.5 to 6.0 parts by weight of the polymerization initiator component be included for 100 parts by weight of the photopolymerization resin component. It is preferable that the weight ratio of the photothermal polymerization initiator to the photopolymerization initiator be in the range of 1 to 4.

In addition, for the chain-curing type resin composition, a resin composition, which is produced by mixing a photopolymerization resin component with a photopolymerization starter component and a curing agent component used in cold-setting or hot-setting a photopolymerization resin component, for example, can be used (Japanese Patent Application Laid-Open No. 2001-89639, Japanese Patent No. 4108094, and Japanese Patent No. 4241721). In this resin composition, an epoxy resin with a cyclic ether structure as its molecular structure is preferable as the photopolymerization resin component. For the photopolymerization starter component, an iron-allene-based compound and a sulfonium salt are preferable. For the curing agent component, an acid anhydride is preferable. It is preferable that the curing agent component be mixed with the photopolymerization resin component at the ratio of 0.1 to 1.4 mol of the curing agent component to 1 mol of the photopolymerization resin component. In addition, it is preferable that the components of the resin composition other than the photopolymerization starter component be mixed with the photopolymerization starter component at the ratio of the total weight of 100 parts by weight of such other components to 0.1 to 6.0 parts by weight of the photopolymerization starter component.

Furthermore, for the chain-curing type resin composition, a resin composition including a cycloaliphatic epoxy having two cyclohexane oxides in a molecule and a denatured bisphenol A-type epoxy resin and of which the content of the cycloaliphatic epoxy is 25 to 90% by mass when the total amount of the above-described two components is taken as 100% by mass, for example, can be used, and a resin composition including a cycloaliphatic epoxy having two cyclohexane oxides in a molecule, a denatured bisphenol A-type epoxy resin, and a liquid bisphenol A type epoxy resin and of which the content of the cycloaliphatic epoxy is 25 to 90% by mass when the total amount of the above-described three components is taken as 100% by mass, for example, can be used. For example, the resin composition discussed in Japanese Patent Application Laid-Open No. 2011-079989 can be used.

By using the chain-curing type resin composition like this, heat and energy such as UV rays are applied to induce a chain curing reaction, and thereby, the resin material in the molding jig 1 can be cured. Even if the core mold 2 has a shape with which it becomes difficult to apply curing energy uniformly to the entire resin material, the curing of the entire resin material can be completed in a short period of time because during the chain cure reaction, the cure reaction progresses as a chain reaction due to the self-generated heat.

With respect to the cure time, although it varies according to the dimension of the material to be molded, the thickness of the plate, the type of the resin, and the like, it takes about one to ten minutes from the start of the chain curing to the completion of the curing in the case of a common carbon-fiber-reinforced plastic (CFRP) which is about 1 m long and wide and about 2 mm thick, for example. In performing the curing, the resin material may be cured to reach its handleable state, i.e., the primarily cured state described above.

For the resin material, a curable resin can be used as well as the chain-curing type resin composition. For the curable resin, an epoxy resin, a phenol resin, a bismaleimide resin, a polyimide resin, an unsaturated polyester resin, a benzoxazine resin, and the like can be used, for example.

Figure 6:
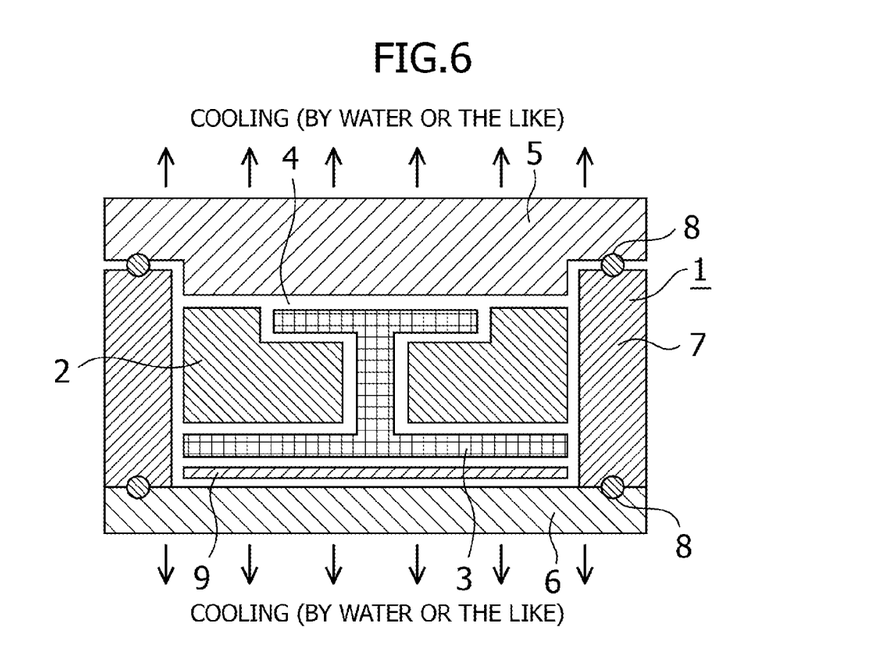

After the primary cure, the molding jig 1 is cooled by water or the like where necessary (FIG. 6). By cooling the molding jig 1, the handling of the molding jig 1 becomes safe and easy, removal of the core mold 2 and the fiber reinforced resin from the molding jig 1 becomes safe and easy, and also the control of the primarily cured state becomes easy.

When the resin material is cured, the stiffener raw material is taken out from the molding jig 1.

The panel raw material can be prepared by laminating 2 to 200 pieces of prepregs with a thickness of 0.1 to 0.4 mm, for example. However, the present embodiment is not limited to this. The prepreg can be prepared by impregnating a matrix resin into carbon fibers, for example. For the matrix resin, the above-described resins and resins for prepregs for aircraft structure can be employed. For the matrix resin, a poly(phenylene sulfide) (PPS) resin, a poly(etheretherketone) (PEEK) resin, a polyetherketoneketone (PEKK) resin, a polyetherketone (PEK) resin, a polyimide (PI) resin, a polyetherimide (PEI) resin, a polyamide (PA), and the like can be used, for example.

The panel raw material may be prepared by impregnating a matrix resin before being cured into the lamination of 2 to 200 pieces of carbon fiber base material. For the carbon fiber base material, a carbon fiber fabric or the like is used, for example. A preform and a non-crimped fabric formed by previously forming a laminate of several layers may be used. The number of the layers of the preform and the non-crimped fabric to be laminated is determined in consideration of the number of pieces of the preform and the non-crimped fabric having been previously laminated. This process can also be prepared by RTM molding performed after a process similar to the process performed for preparing the above-described stiffener raw material. Alternatively, the resin impregnation process may be performed after the stiffener raw material has been assembled. In either of these configurations, the panel raw material can also be assembled with the stiffener raw material without using an adhesive.

Figure 7:
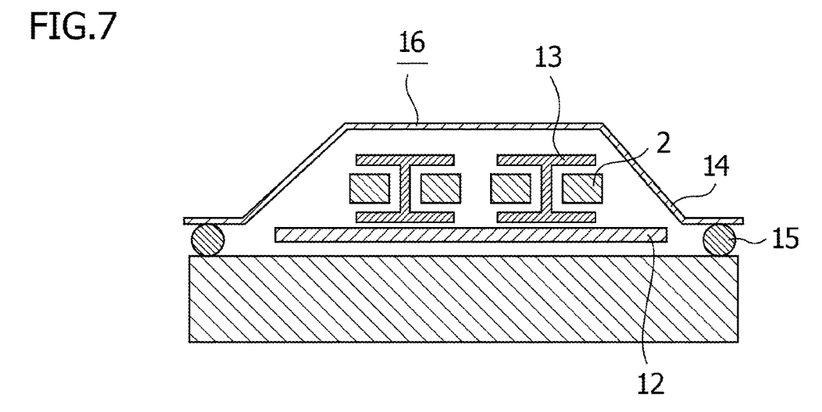
FIG. 7 is a view illustrating an embodiment of the method of producing a composite material according to the present invention, which is a cross section illustrating a state in which a panel raw material is assembled to a primarily cured stiffener raw material.

An embodiment of steps for assembling the panel raw material to the primarily cured stiffener raw material will be described below with reference to FIG. 7.

In this step, a prepreg 12 constituting the panel raw material is placed on the jig. Then a stiffener raw material 13 is assembled in a state in which the core mold 2 is being held via the adhesive. The molded product raw material is covered with a bagging film 14 to create a vacuum in the inside of the assembled body. The reference numeral 15 indicates a sealer.

Figure 8:
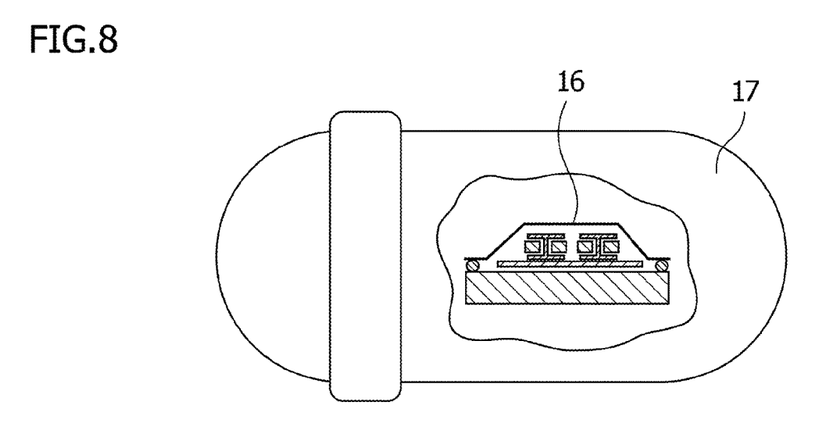
FIG. 8 is a view illustrating an embodiment of the method of producing a composite material according to the present invention, which is a cross section illustrating a state in which the stiffener raw material is subjected to secondary curing for integration of the stiffener raw material and the panel raw material.

An assembled body 16 having been obtained in this manner is introduced into an autoclave (pressurized heating can) 17 as illustrated in FIG. 8. The assembled body 16 is heated to a temperature equal to or higher than the glass transition point of the stiffener raw material 13, to cause the phase of the stiffener raw material 13 to transition into a rubberized state, the assembled body is thus allowed to coexist with the stiffener raw material 13 in the rubberized state in the process of curing the adhesive existing adjacent to the stiffener raw material 13, and the stiffener raw material 13 is secondarily cured to integrate the stiffener raw material 13 and the panel raw material 12.

Figure 9:
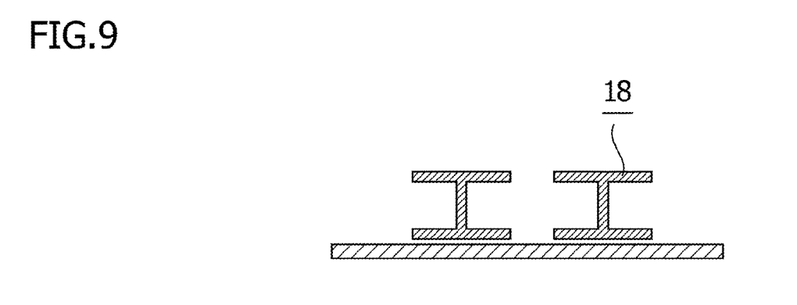
FIG. 9 is a view illustrating an embodiment of the method of producing a composite material according to the present invention, which is a cross section illustrating an integrated stiffener panel.

An integrally formed stiffener panel 18 illustrated in FIG. 9 is obtained in the above-described manner.

Note that the method of producing a composite material according to the present invention can be implemented by a method in which the relationship between the panel raw material and the stiffener raw material is opposite to the above-described process and the panel raw material is prepared by primary curing.

Now, a relationship between temperature conditions for integrally forming the stiffener panel as described above will be further described below.

Figure 10:
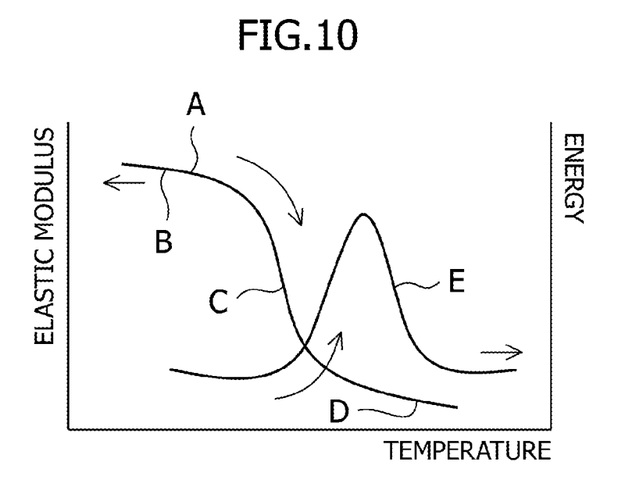
FIG. 10 is a graph showing variation of the elastic modulus of the primarily cured molded product raw material and variation of the quantity of heat in an adhesive.

Temperature Dependency of the Elastic Modulus of the Molded Product Raw Material As illustrated in FIG. 10 by a curve A, as a result of measurement of the temperature dependency of the elastic modulus by measuring the viscoelasticity of a primarily cured (half-cured) material such as the stiffener raw material described above, the storage elastic modulus gradually decreases as the temperature increases (from room temperature) (the glass state, a part B). When a specific temperature is exceeded, the storage elastic modulus abruptly decreases as the temperature increases (variation of state from the glass state to the rubberized state, a part C. This state transition point is referred to as the "glass transition point", and the temperature for the transition point is referred to as a "glass transition temperature (Tg)").

Furthermore, when a specific temperature is exceeded, the storage elastic modulus gradually decreases with the rubberized state being maintained as the temperature decreases (the rubberized state, a part D). To compare the storage elastic modulus in the rubberized state with the storage elastic modulus in the glass state, the storage elastic modulus in the rubberized state is lower than the storage elastic modulus in the glass state by 50% or more of the storage elastic modulus in the glass state or by an order of magnitude or more.

After the curing is completed, Tg shifts to the side of high temperatures.

A curve E illustrates an energy curve for the side of the adhesive as a model.

Primary Curing (Half-cured State)

The term "primary curing [half curing (half-cured state)]" for curable resins generally refers to a state in which the curing is generally incomplete or insufficient (i.e., a state in which the cure reaction has not been completed).

All the materials that have not been completely cured can be considered as being in the half-cured state. However, even the materials constituted by the same resin can exert completely different characteristics in terms of a variety of characteristic aspects (physical characteristics, mechanical characteristics, and chemical characteristics) depending on the degree of curing (how far the curing has progressed).

Meaning of the Primarily Cured State (low-Tg Control Type-cured State) in the Present Invention As characteristics of the present invention, in integrally forming the molded product raw material for a composite material, the cured state of the molded product raw material used for the integration is controlled in consideration of Tg, and a molded product raw material having been controlled to be in a cured state (low-Tg control type-cured state) is used for the integration, and the molded product raw material used for the integration is a molded product raw material having been essentially in a state in which it has a Tg lower than Tg for the molded product raw material in a completely cured state and in a state in which the matrix resin would not be liquefied as a liquid in the process of increase of the temperature performed for the integration at the same time, and also, the molded product raw material used for the integration has Tg controlled within a temperature range to be described below (in the following section "Correlation between Tg for the molded product raw material in the primarily cured state (low-Tg control type-cured state) and the adhesive reaction temperature/Tg control point").

More specifically, the molded product raw material is in the half-cured state in a broad sense; however, the half-cured state is not the primarily cured state (low-Tg control type-cured state) at all, and thus, the present invention is not achieved by using a molded product raw material in a mere half-cured state.

Correlation Between Tg for the Molded Product Raw Material in the Primarily Cured State (Low-Tg Control Type-cured State) and the Adhesive Reaction Temperature/Tg Control Point To obtain a molded product raw material in the primarily cured state (low-Tg control type-cured state), it is important to determine to what temperature Tg for the molded product raw material is to be controlled. This Tg is determined in accordance with the correlation with the reaction temperature of the joint contact surface mating material (an adhesive or other molded product raw material) for the adhesive to be used or the like. More specifically, the Tg obtained when the primary curing is completed and the reaction temperature of the adhesive variously differ, respectively, due to the material type of the molded product raw material to be used and the type of the adhesive to be used. However, for the Tg for the molded product raw material in the primarily cured state (low-Tg control type-cured state), the glass transition temperature Tg that shows correlation with the following reaction temperature (Tr) of the adhesive is effective regardless of the type of material of the molded product raw material to be used and the type of the adhesive to be used. The following example is described with reference to a case of using the adhesive. However, the temperature Tr refers to a reaction temperature of the joint contact surface mating material of the molded product raw material in the primarily cured state (low-Tg control type-cured state). For example, if the joint contact surface mating material is not an adhesive, but is a prepreg material or a matrix resin for RTM, then Tr can be substituted with the reaction temperature for the respective material to be used.

First, Tg for the molded product raw material in the primarily cured state (low-Tg control type-cured state) is defined as any of the following (1) to (3).

(1) Storage elastic modulus decrease start point Tg1 (onset value for the glass state side)

This is determined by measuring the viscoelasticity of the molded product raw material in the primarily cured state. As an embodiment of the measurement, the upper portion and the lower portion of the test piece (flat plate) are fixed by a chuck and heat is applied at a predetermined rate of temperature increase. Then, the chuck for the lower portion is twisted and the degree of the twist is sensed at the upper chuck. The variation in the elastic modulus is determined on the basis of the difference between the elastic moduli at the chuck for the upper portion and the chuck for the lower portion.

Figure 11:
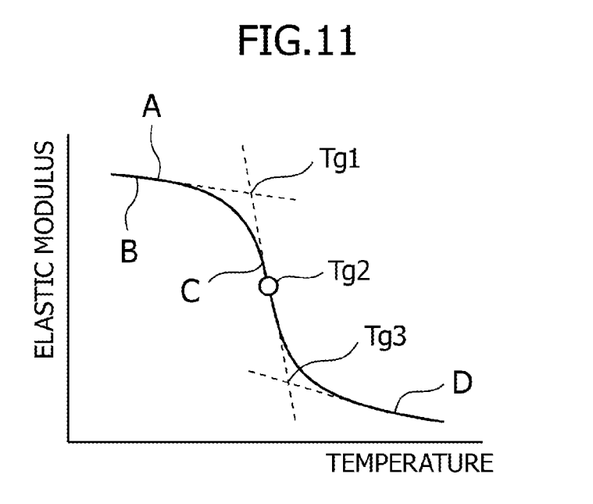
FIG. 11 is a graph showing the technical significance of glass transition points Tg1, Tg2, and Tg3.

Referring to FIG. 11, an intersection between the vector extrapolation in the part B in the initial period of the warming and the vector extrapolation in the part C in which the elastic modulus abruptly decreases is set as the storage elastic modulus decrease start point. Because variation of the elastic modulus influences on the performance, a value before the variation is set as the index at the stage of rigidity design, and accordingly, it is appropriate to determine the storage elastic modulus decrease start point in the above-described manner.

(2) Temperature Tg2 at the timing around the midpoint of the phase transition from the glass state to the rubberized state (i.e., a temperature for tan δ (=loss elastic modulus/storage elastic modulus) to reach its peak)

This is also illustrated in FIG. 11.

This is also determined by measuring the viscoelasticity of the molded product raw material in the primarily cured state.

(3) Storage elastic modulus decrease end point Tg3 (onset value for the rubberized state side, or a peak value of the decrease of the storage elastic modulus)

This is also determined by measuring the viscoelasticity of the molded product raw material in the primarily cured state.

Referring to FIG. 11, Tg3 is an intersection between the vector extrapolation in the part C in which the elastic modulus abruptly decreases and the vector extrapolation in the gently curved part D.

In the present invention, the control of the correlation between Tg and Tr can be implemented by controlling the correlation between Tg1 and Tr. It is more preferable to control the correlation between Tg2 and Tr, and it is most preferable to control the correlation between Tg3 and Tr.

On the other hand, Tr for the adhesive to be used is defined as one of the following (1) to (3).

(1) Reaction start point temperature Tr1 [onset value for the reaction starting point side (DSC measurement)]

Figure 12:
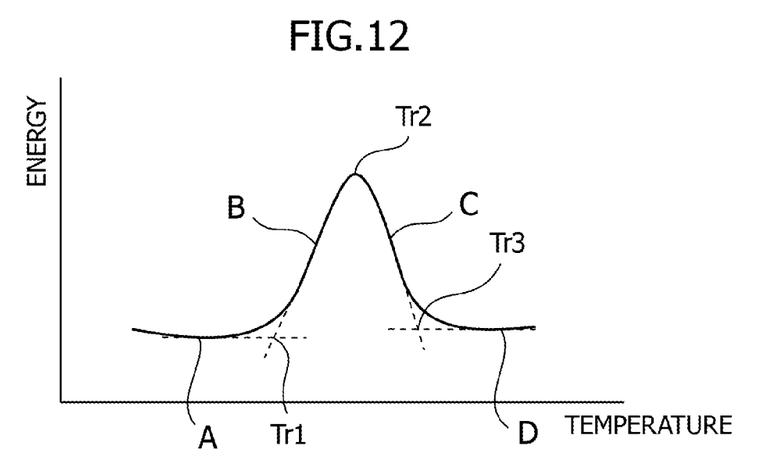
FIG. 12 is a graph illustrating the technical significance of reaction temperatures Tr1, Tr2, and Tr3 for the adhesive.
Figure 13:
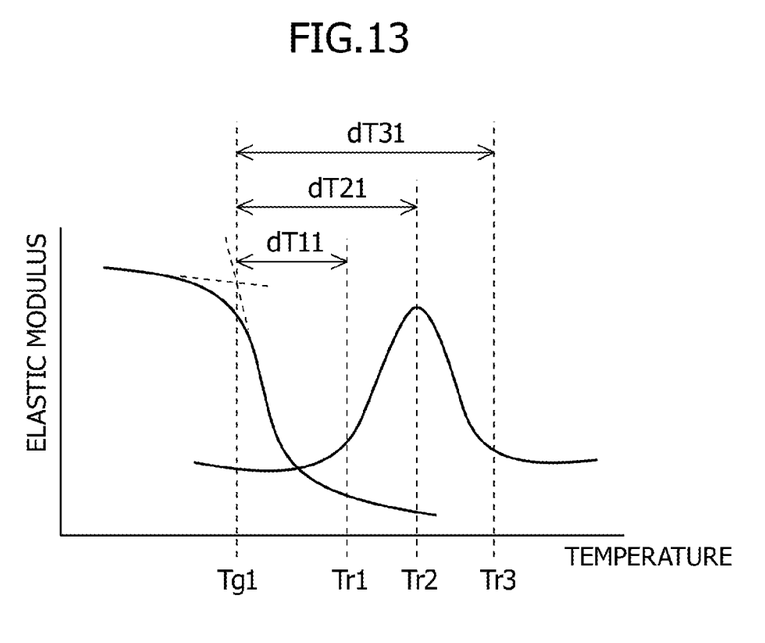
FIG. 13 is a graph illustrating a control range for control values (control range) of correlation between Tg1 and Tr.
Figure 14:
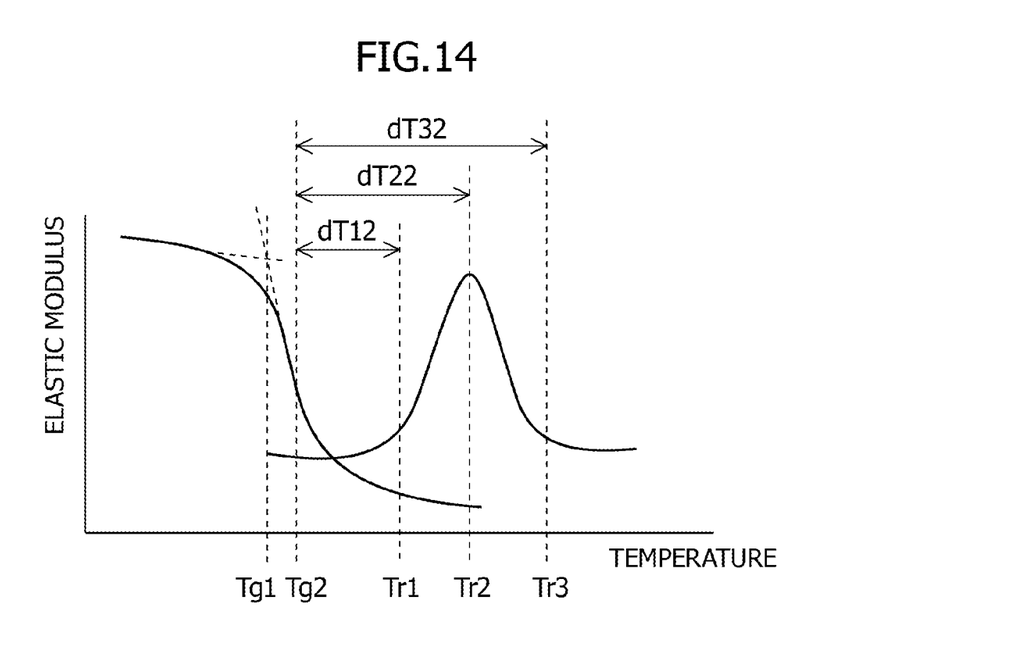
FIG. 14 is a graph illustrating control values (control range) of correlation between Tg2 and Tr obtained by using Tg2, which is more preferable than Tg1 for the control of Tg, as an indicator.
Figure 15:
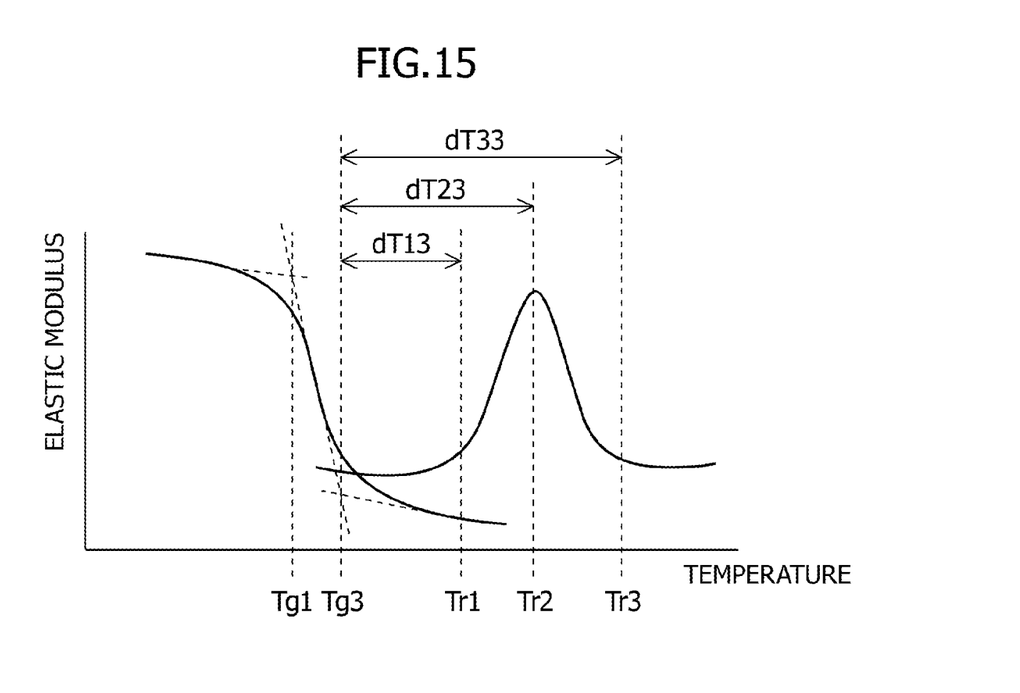
FIG. 15 is a graph illustrating control values (control range) of correlation between Tg3 and Tr obtained by using Tg3, which is yet more preferable than Tg2 for the control of Tg, as an indicator.

Referring to FIG. 12, an intersection between the gently curved part A and the extrapolation of the abruptly curved part B is determined to be Tr1.

Referring to FIG. 12, the quantity of heat (energy) on the ordinate was measured by differential scanning calorimetry (DSC).

(2) Reaction temperature Tr2 [Reaction peak temperature (DSC measurement)]

Tr2 is the peak temperature in FIG. 12.

(3) Reaction end point temperature Tr3 [onset value for the reaction end side (DSC measurement)]

Referring to FIG. 12, an intersection between the abruptly curved part C and the gently curved part D is determined to be Tr3.

In the present invention, the control of the correlation between Tg and Tr can be implemented by controlling the correlation between Tg and Tr3. It is more preferable to control the correlation between Tg and Tr2, and it is the most preferable to control the correlation between Tg and Tr1.

Next, control values (control range) for the correlation between Tg and Tr will be described below on the basis of the above-described definitions. Note that for the cured state of the molded product raw material in the primarily cured state (low-Tg control type-cured state), it is assumed that the molded product raw material in the primarily cured state (low-Tg control type-cured state) has been in the cured state in which the matrix resin of the molded product raw material would not be liquefied as liquid in the process of increase of the temperature performed for the integration.

The following are the control range for the control value (control range) for the correlation between Tg1 and Tr.

(i) A control range where:

$$dT31=Tr3-Tg1 \geq 30°\ C., \text{ and}$$

$$Tr2-Tg1>0°\ C.$$

Note that the symbol "dT" is used to indicate the difference between the temperatures. This applies in the same way for the following descriptions.

(ii) More preferably, a control range where: a control range that is the control range (i) where:

$$dT21=Tr2-Tg1 \geq 25°\ C.$$

(iii) Yet more preferably, a control range that is the control range (ii) where:

$$dT11=Tr1-Tg1 \geq 20°\ C.$$

The greater the temperature difference between Tr and Tg in the ranges (i) to (iii) is, the more preferable they may be.

Now, control values (control range) for the correlation between Tg2 and Tr, with Tg2 that is more preferable than Tg1 for the control of Tg being used as the index, will be described below.

(iv) A control range where:

$$dT32=Tr3-Tg2 \geq 10°\ C., \text{ and}$$

$$Tr2-Tg1>0°\ C.$$

(v) More preferably, a control range where: a control range that is the control range (iv) where:

$$dT22=Tr2-Tg2 \geq 5°\ C.$$

(vi) More preferably, a control range where: a control range that is the control range (v) where:

$$dT12=Tr1-Tg2 \geq 0°\ C.$$

The greater the temperature difference between Tr and Tg in the ranges (iv) to (vi) is, the more preferable they may be.

Now, control values (control range) for the correlation between Tg3 and Tr, with Tg3 that is further preferable than Tg2 for the control of Tg being used as the index, will be described below.

(vii) A control range where:

$$dT33=Tr3-Tg3 \geq 0°\ C., \text{ and}$$

$$Tr2-Tg1>0°\ C.$$

(viii) More preferably, a control range where:

$$dT23=Tr2-Tg3 \geq 0°\ C.$$

(ix) Yet more preferably, a control range where:

$$dT13=Tr1-Tg3 \geq 0°\ C.$$

(x) Most preferably, a control range where:

$$dT13=Tr1-Tg3 \geq 10°\ C.$$

The greater the temperature difference between Tr and Tg in the ranges (vii) to (x) is, the more preferable they may be.

According to the present invention, by setting the control range for the temperatures in the above-described manner, the assembled body is heated to a temperature equal to or higher than the glass transition point of at least one primarily cured molded product raw material (e.g., a stiffener raw material); the phase of at least one molded product raw material is shifted to the rubberized state; the adhesive existing adjacent to the stiffener raw material or another molded product raw material existing adjacent to the molded product raw material is allowed to coexist with the molded product raw material in the rubberized state in the process of curing; the primarily cured at least one molded product raw material is secondarily cured; and thereby, the at least one molded product raw material and the another molded product raw material can be integrally formed.

Method of Establishing Conditions for Molding into the Primarily Cured State (Low-Tg Control Type-cured State)

An example of the method of establishing conditions for molding into the primarily cured state (low-Tg control type-cured state) will be described.

However, the method is not limited to the following method, and what is important is to obtain the above-described cured state.

The temperatures Tr (Tr1, Tr2, Tr3) that are the reaction temperatures for the adhesive are measured by DSC measurement.

DSC measurement of a material used as the molded product raw material to be brought into the primarily cured state (low-Tg control type-cured state) is performed, and the cure (reaction) start temperature Tp1 is measured.

Figure 16:
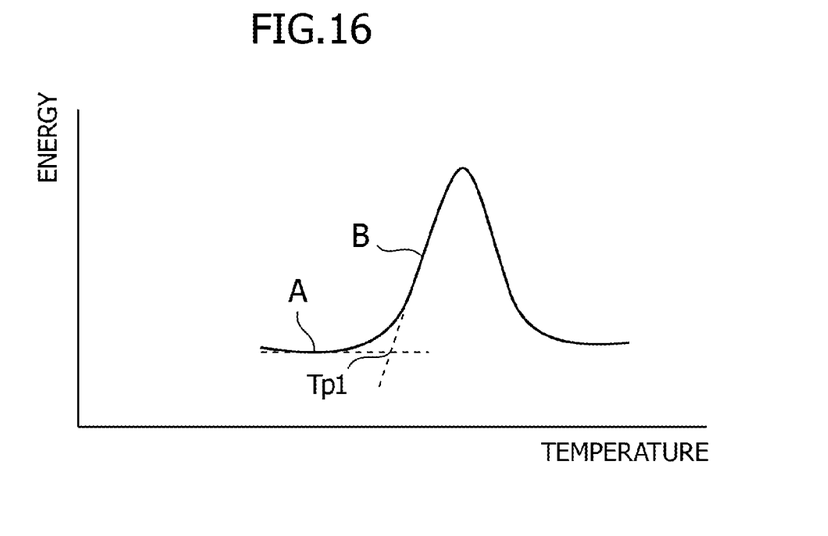
FIG. 16 is a graph illustrating a curing (reaction) starting temperature Tp1 obtained when differential scanning calorimetry (DSC) measurement of a material used as the molded product raw material to be shifted to a primarily cured state (i.e., a low-Tg control type-cured state) is carried out.

In this process, Tp1 is the curing (reaction) start point [onset value for the reaction start side (DSC measurement)], and Tp1 is defined as an intersection between the gently curved part A and the extrapolation of the abruptly curved part B as illustrated in FIG. 16.

In the molding of the molded product raw material to be brought into the primarily cured state (low-Tg control type-cured state), the molded product raw material is molded at the cure start temperature of Tp1 for 30 minutes of holding for the molding temperature and the holding time, and Tg (provisional Tg) for this molded product raw material is measured on the basis of the viscoelasticity.

This Tg (provisional Tg) and the Tr (Tr1, Tr2, Tr3) having been measured for the adhesive are compared, and it is examined whether the values of Tg and Tr are within the set control values [control ranges (i) to (x)]. If the above-described Tg (provisional Tg) is not within the control values [control ranges (i) to (x)] or if Tg (provisional Tg) is not within the range targeted in the control values [control ranges (i) to (x)], and if Tg (provisional Tg) is too high, then the molding condition is changed to a cure start temperature lower than the originally set cure start temperature by 10° C. or the holding time is reduced by 50% to about 15 minutes (or both), and the composite material is molded under these conditions and Tg (provisional Tg) is measured again. If the stiffener raw material is liquefied during the measurement of Tg (and if the Tg (provisional Tg) is too low), then the molding condition is changed by increasing the cure start temperature by 10° C. or by increasing the holding time by 100% for 1 hour (or both), and the composite material is molded under these conditions and Tg (provisional Tg) is measured again.

As another method, after the molded product raw material is molded at the molding temperature decreased from the molding temperature set in the molding conditions recommended by the manufacturer or the like by 20° C., then Tg (provisional Tg) is measured in the similar manner as that described above on the basis of the viscoelasticity, and then, the molded product raw material is molded at the molding temperature further increased or decreased by 10° C. on the basis of results of the measurement similarly to the above, and subsequently, Tg (provisional Tg) is measured in the similar manner as described above on the basis of the viscoelasticity.

As yet another method, a method in which the targeted Tg is used as the index for the holding temperature for the molding can be used, for example.

Usually, the molding conditions for the primarily cured state (low-Tg control type-cured state) can be established by performing several tests for both of the above-described methods.

Others Matters

It is useful to provide a step (temperature holding step) for controlling the temperature within a temperature range of Tg1 or higher to Tr3 or lower as a temperature raising condition for the molding process for bonding. For the temperature range (Tg and Tr) for providing the step, the temperature range on the Tg side is preferably Tg2 or higher, and more preferably Tg3 or higher. On the other hand, the temperature range on the Tr side is preferably Tr2 or lower, and more preferably Tr1 or lower.

The embodiment of the present invention is as described above. However, the present invention is not limited to the above-described embodiment and can be implemented by various alterations and modifications on the basis of the technical idea of the present invention.

REFERENCE SIGNS LIST

1 Molding jig
2 Core mold
3 Fiber base material
4 Cavity
5 Upper lid
6 Lower lid
7 Frame mold
8 Sealer
9 Release agent
10 Vacuum pipe
11 Resin injection pipe
12 Prepreg
13 Stiffener raw material
14 Bagging film
15 Sealer
16 Assembled body
17 Autoclave
18 Stiffener panel

The invention claimed is:

1. A method of producing a composite material, in which the composite material is constituted by at least two molded product raw materials, the method comprising:
preparing at least one of the molded product raw materials for constituting the composite material by primary curing;
preparing an assembled body by assembling the primarily cured molded product raw material with another molded product raw material for constituting the composite material via an adhesive or by not using an adhesive; and
integrally forming the primarily cured molded product raw material and the another molded product raw material by heating the assembled body to a temperature equivalent to or higher than a glass transition point of the at least one primarily cured molded product raw material to cause a phase of the primarily cured molded product raw material to transition into a rubberized state, by allowing an adhesive existing adjacent to the primarily cured molded product raw material or the another molded product raw material existing adjacent to the primarily cured molded product raw material to coexist with the primarily cured molded product raw material in the rubberized state, and by secondarily curing the primarily cured molded product raw material,
wherein the following temperatures Tg1, Tg2, Tg3, Tr1, Tr2, and Tr3 are determined:
Tg1: a storage elastic modulus decrease start point for the primarily cured molded product raw material;
Tg2: a temperature at a timing around a midpoint of phase transition from a glass state to the rubber state of the primarily cured molded product raw material;
Tg3: a storage elastic modulus decrease end point for the primarily cured molded product raw material;
Tr1: a reaction start point temperature for the adhesive existing adjacent to the primarily cured molded product raw material or the another molded product raw material existing adjacent to the primarily cured molded product raw material;
Tr2: a reaction temperature for the adhesive existing adjacent to the primarily cured molded product raw material or the another molded product raw material existing adjacent to the primarily cured molded product raw material; and
Tr3: a reaction end point temperature for the adhesive existing adjacent to the primarily cured molded product raw material or the another molded product raw material existing adjacent to the primarily cured molded product raw material,
wherein a glass transition point Tg for the primarily cured molded product raw material and a reaction temperature Tr for the adhesive existing adjacent to the primarily cured molded product raw material or the another molded product raw material existing adjacent to the primarily cured molded product raw material are set so as to satisfy the following conditions (i) to (ix):
(i) a control range where:

$dT31=Tr3-Tg1 \geq 30°$ C., and $Tr2-Tg1>0°$ C.;

(ii) a control range that is the control range (i) where:

$dT21=Tr2-Tg1 \geq 25°$ C.;

(iii) a control range that is the control range (ii) where:

$dT11=Tr1-Tg1 \geq 20°$ C.;

(iv) a control range where:

$dT32=Tr3-Tg2 \geq 10°$ C., and $Tr2-Tg1>0°$ C.;

(v) a control range that is the control range (iv) where:

$dT22=Tr2-Tg2 \geq 5°$ C.;

(vi) a control range that is the control range (v) where:

$dT12=Tr1-Tg2 \geq 0°$ C.;

(vii) a control range where:

$dT33=Tr3-Tg3 \geq 0°$ C., and $Tr2-Tg1>0°$ C.;

(viii) a control range where:

$dT23=Tr2-Tg3 \geq 0°$ C.; and (ix) a control range where:

$dT13=Tr1-Tg3 \geq 0°$ C., the method further comprising, in order, the following:
measuring, by DSC measurement, a primary curing start temperature Tp1, where Tp1 is the primary curing reaction start point;

molding to form the primarily cured molded product raw material at Tp1 for a holding time of about 30 minutes;

measuring, on the basis of viscoelasticity, Tg1, Tg2, and Tg3;

wherein

Tr1, Tr2, and Tr3 are measured by DSC measurement, if one or more of (i)-(ix) is not satisfied because at least one of Tg1, Tg2, and Tg3 is too high, the temperature Tp1 is then reduced by 10° C. and/or the holding time is reduced by about 50%, the primarily cured molded product raw material is then molded, and Tg1, Tg2, and Tg3 are measured again, and if one or more of (i)-(ix) is not satisfied because at least one of Tg1, Tg2, and Tg3 is too low, the temperature Tp1 is then increased by 10° C. and/or the holding time is increased by about 100%, and the primarily cured molded product raw material is then molded, and Tg1, Tg2, and Tg3 are measured.

2. The method of producing the composite material according to claim 1, wherein the composite material is a composite material including a stiffener raw material and a panel raw material, and wherein the stiffener raw material is primarily cured.

3. The method of producing the composite material according to claim 2, wherein the stiffener raw material includes a fiber reinforced resin that uses a chain-curing type resin.

* * * * *